United States Patent [19]

Cochran et al.

[11] Patent Number: 5,061,185
[45] Date of Patent: * Oct. 29, 1991

[54] TACTILE ENHANCEMENT METHOD FOR PROGRESSIVELY OPTIMIZED READING

[75] Inventors: Kirby Cochran, Orem; Harper Nelson, Alpine, both of Utah

[73] Assignee: American Business Seminars, Inc., Provo, Utah

[*] Notice: The portion of the term of this patent subsequent to Apr. 16, 2008 has been disclaimed.

[21] Appl. No.: 613,079

[22] Filed: Nov. 14, 1990

Related U.S. Application Data

[63] Continuation-in-part of Ser. No. 482,388, Feb. 20, 1990, Pat. No. 5,007,838.

[51] Int. Cl.$^5$ .............................................. G09B 17/00
[52] U.S. Cl. ..................................... 434/178; 434/179; 434/318; 434/319
[58] Field of Search ............... 434/178, 179, 319, 308, 434/318, 236; 381/73.1

[56] References Cited

U.S. PATENT DOCUMENTS

| | | | |
|---|---|---|---|
| 2,777,901 | 1/1957 | Dostert | 179/100.2 |
| 3,038,120 | 6/1962 | Bernstein et al. | 324/68 |
| 3,093,914 | 6/1963 | Bernstein | 35/35 |
| 3,368,551 | 2/1968 | Hardyck | 434/178 X |
| 3,672,074 | 6/1972 | Huffstetter | 35/35 H |
| 3,745,674 | 7/1973 | Thompson et al. | 35/9 R |
| 3,968,576 | 7/1976 | Taylor | 35/35 B |
| 4,035,930 | 7/1977 | Lambert | 35/22 R |
| 4,055,908 | 11/1977 | Greene et al. | 35/35 R |
| 4,078,319 | 3/1978 | Mazeski et al. | 35/35 R |
| 4,189,852 | 2/1980 | Chatlien | 434/178 |
| 4,354,841 | 10/1982 | Meeder | 434/157 |
| 4,421,488 | 12/1983 | Parlenvi et al. | 434/185 |
| 4,759,720 | 7/1988 | Niemoller | 434/319 |
| 4,775,322 | 10/1988 | Behunin | 434/179 |
| 4,777,529 | 10/1988 | Schultz et al. | 434/319 X |

FOREIGN PATENT DOCUMENTS

| | | |
|---|---|---|
| 1237679 | 6/1960 | France . |
| 2588985 | 10/1985 | France . |
| 993970 | 6/1965 | United Kingdom . |

Primary Examiner—Richard J. Apley
Assistant Examiner—J. Doyle
Attorney, Agent, or Firm—Lynn G. Foster

[57] ABSTRACT

A method and system for enhancing reading skills whereby readers can improve both reading speed and comprehension. This novel teaching method and system associatively combines input to visual, tactile, and auditory senses. The reader is trained to conceptualize the meaning of words directly from symbols rather than from symbols and related sounds by causing the eyes to scan text more rapidly than both symbols and related sounds can be assimilated. The eyes are prompted to follow a rapidly moving finger induced to rhythmically move back-and-forth across the text at rapidly driven rates by an auditory beat. Different auditory inputs are provided to each ear, such that each hemisphere of the brain predominately receives signals which are related to its primary function. Rhythmic beats to induce higher reading rates are addressed to the left hemisphere of the brain which governs spatial relations, time, rhythm, and reading the written word. Subliminal affirmative motivational messages are concurrently addressed only to the right hemisphere of the brain which interprets the spoken word thereby minimizing conflict between the spoken subliminal affirmations and the reading of the written word. In one embodiment, rhythmic beats are mixed with the subliminal messages addressed to the right hemisphere for balance. Soothing background sounds such as recorded ocean waves are added to the auditory input to block aural interference. The auditory volume of rhythmic beats is varied periodically to reduce neural auditory adaptation.

8 Claims, 2 Drawing Sheets

TACTILE ENHANCEMENT METHOD FOR PROGRESSIVELY OPTIMIZED READING

CONTINUITY

This application is a continuation-in-part of copending application Ser. No. 482,388 filed Feb. 20, 1990, now U.S. Pat. No. 5,007,838.

FIELD OF INVENTION

This invention relates to systems and methods for improving reading speed and comprehension. In particular, it relates to a method which takes advantage of functional modal differences in the two sides of the brain, associatively and correlatively combining input to sight and tactile senses with synchronized, but independent auditory input to each ear and, therefrom, to the two hemispheres of the brain, to train individuals to read faster with better comprehension. Restated, the present reading system stimulates reading and assimilation of the written word but does not interfere, conflict or compete with the left brain processing of the written word.

RELATED ART AND BACKGROUND

Early reading skill is usually developed using vocalization techniques whereby the student first learns to "sound out" words. Even after silent reading skills are developed, readers usually continue to mentally sound out each word. This process is called subvocalization. Time required to subvocalize each word generally restricts the mastery of higher reading speed and comprehension.

In addition to subvocalization, reading also involves two other processes, translation and placement. Translation involves part-of-speech classification, building a mental image of the meaning of the word, and subliminally bringing to mind related words and images. Placement involves determining the context of the word in the sentence or text being read. Subvocalization is the only one of the three processes not required when reading, although translation and placement may be expanded beyond words to groups of words and phrases.

Eye movement during sight reading is not linear, but interrupted movement as the eyes jump from one point on a line to another, stopping momentarily to gather information before jumping to the next point. Each time the eye stops is called "fixation". The human eye is capable of five to six fixations per second. At each fixation, the average reader can subvocalize, translate, and place about three words. Better subvocalizing readers who can read four words per fixation have a maximum reading speed under 1500 words per minute.

It has been found that readers who read above 1500 words per minute do not go through the entire reading process (i.e. they do not subvocalize, translate, and place each word). Instead, they are able to grasp the meaning of an entire phrase or part or all of a sentence without having to read each word. This process, called "chunking", allows the reader to comprehend manifold times as much information as a reader who must read each word. All speed reading methods concentrate on breaking the subvocalization habit and replacing it with chunking proficiency.

Multiple sensory inputs have been used to assist readers to break the subvocalization habit. It has been proved that reading speed can be controlled and increased by moving a finger across each line of text. The reader's eyes automatically follow the path traced by the finger, even though it may move across the page more rapidly than the reader's fixation and ordinary scan rate. When practiced, this motion can cause subvocalization to be discarded in favor of reading words in groups, phrases, and sentences. Reading studies have shown that using the body's natural hand-eye coordination can greatly improve reading skills. Most speed reading methods teach hand-eye coordination.

In limited application in the past, auditory sensation has been combined with sense and touch to teach new methods of increasing reading speed. A method disclosed in U.S. Pat. No. 4,775,322 is directed toward cyclic stereophonic sound patterns which pan from left to right and right to left to pace reader's finger and eye movement across lines of text. Stereophonic transmission is used wherein volume is cyclicly decreased in one speaker while being increased in the other to provide the sensation of movement from one side to the other to attempt to synchronize the rate of finger travel across lines on the page. In practice however, this method has not produced significantly better results than methods which only use eye and finger movement.

The primary method of breaking the subvocalization habit comprises visual and tactile feedback of a finger (usually the index finger of the dominant hand) moving across a line of text too quickly for the mind to subvocalize each word. The eye automatically follows the path traced by the moving finger, even though it moves across the page much faster than the reader can read. Concentration upon the moving finger delivers text to the eye while tending to focus the mind on a single task. It is this rapid side-to-side motion that breaks the subvocalization habit and causes the reader to learn to read chunks of information.

The brain is divided into two hemispheres that perform very different functions, called hemispherical specialization. Although most thought is bilateral (i.e. it takes place on both sides of the brain), each hemisphere of the brain specializes to a degree in a specific type of thinking.

It is well known that the motor functions of the left side of the brain govern the right side of the body and vice versa. For example, when the left hand is raised, the electrochemical signal originated in the right side of the brain.

There is also hemispherical specialization in the manner in which the brain governs abstract thought. In most individuals, the right hemisphere is then the center for art, music, and other forms of creative expression. Consistent with this, the right hemisphere is, then, the center for processing the spoken word, rather than the written word. In these individuals, the left hemisphere governs logical, mathematical, businesslike thought, spacial relations, time, and rhythm. Although one must be careful not to overgeneralize, each hemisphere does have a greater influence over its own though domain.

Messages can reach the brain subliminally without exciting conscious thought. The conscious mind evaluates, blocks, and otherwise disposes of received information it is unwilling to accept, while subliminal messages reach the brain unscreened and uninhibited. When these subliminal messages are used to motivate and reinforce learning activity, they are called subliminal affirmations. By bypassing the conscious mind, subliminal affirmations can have greater impact than conscious messages in a learning environment.

An auditory subliminal programming system, disclosed in U.S. Pat. No. 4,777,529, primarily addresses the problems of mixing subliminal affirmations with a separately provided, low frequency stereophonic signals, automatically varying the amplitude of the subliminal message as a function of the amplitude of the stereophonic signals to produce a composite stereophonic auditory signal output comprising a mix of each stereophonic input with the single subliminal message string. A security system is provided in the form of predetermined tones which only allow such mixing only if the security tones are present in the subliminal message signal. The mixer indiscriminately places so accepted subliminal messages on both channels of a conventional stereophonic audio amplifier, while providing no discrimination as to which ear receives the so accepted subliminal messages.

Recognizing potentially negative aspects of providing messages to the brain which are not consciously and inhibitively processed, it is recommended that all such subliminal affirmations be provided in written form to the learning reader for his perusal, before use. Another advantage of prereading subliminal affirmations is reinforced assimilation of the affirmations by the conscious and unconscious minds.

BRIEF SUMMARY AND OBJECTS OF THE INVENTION

In brief summary, this invention comprises novel systems and methods for increasing reading speed and comprehension more rapidly and with better results than all prior art proposals and another system and method to provide tape recordings for use with this novel system. Physiological tools comprising the senses of touch, sight, hearing and the specificity of central nervous systems' neurological pathways are used. This invention teaches the reader to separate symbols from sounds. In other words, the readers learns to conceptualize without translating the symbols (written words) into sounds, thereby overcoming the habit of subvocalization. By translating symbols directly into concepts, the reader may increase his reading ability tenfold.

Rhythmic hand movement is a key factor in learning to read chunks of information rapidly. This invention provides a novel method of inducing rhythmic hand movement while subliminally reinforcing learning conditions with uninhibited auditory input.

This method comprises novel teaching means which provide different auditory signals to each ear to further stimulate the learning activity. To the ear which is most directly connected to that hemisphere of the brain which handles time and rhythm, a signal comprising rhythmic beats, which reinforce the rate at which the reader's finger is to be moved to scan the text, is sent.

Novel, barely audible signals comprising subliminal affirmations are dispatched to the other ear. As a result, subliminal affirmations addressed to the left hemisphere of the brain are sent to the right ear. Initially, it was thought that rhythmic beats should be addressed primarily to the right hemisphere of the brain via the left ear. In doing so, it has been discovered that on occasions such delivery of an audible beat only to the left ear materially, consciously distracts the reader reducing the reader's concentration and reducing reading efficiency. Experimentation has established that such distraction can be eliminated or substantially alleviated by delivery of the beat to both ears. It has been further found that by restricting delivery of the subliminal messages to the left ear and, therefore, primarily to tho right hemisphere of the brain, while beat and background sound are each sent to both sides of the brain, there is essentially no distraction on either side of the brain and no conflict or competition at the left hemisphere of the brain where the written word is processed. Both hemispheres are involved in receiving signals from both ears because auditory pathways are somewhat diffuse. However, by selectively sending an independent mix of auditory signals to right and left ears, respectively, concentration, efficiency, and comprehension are improved.

Background music or soothing sounds, such as ocean waves and related sounds, is provided to block out aural interference and further provide a soothing environment which allows greater concentration on improving reading skills. The volume or loudness of the rhythmic beats is periodically varied to reduce the effect of auditory neural adaptation. In one embodiment, a synchronous rhythmic beat signal beats are sent to each ear to provide a balance of sounds to the brain.

Accordingly, it is a primary object to provide a novel system and method for increasing reading speed and comprehension by employing finger movement and associated tactile sensation to stimulate eye movement.

It is a further primary object to provide a system and method for producing stereophonic tape recordings comprising rhythmic beat and subliminal message information discriminately provided on selected channels of the tape recordings and therefrom used by the reader to increase reading speed.

It is an important object to provide a system and method which produces stereophonic tape recordings comprising rhythmic beats which are periodically varied in amplitude or volume such that the reader does not lose concentration due to neural adaptation.

It is a paramount object to provide a novel system and methods for improving reading skills and efficiency which does not cause distraction at either side of the brain and wherein the written word is processed without conflict or competition at the left side of the brain.

It is a further dominant object to stimulate improved concentration, efficiency and comprehension while reading, by providing distinct mixes of auditory signals to the left and right sides of the brain, respectively, which do not cause distraction, conflict, or competition.

It is a significant object of the invention to cause the finger to move across the text at rates greater than the eye can assimilate if the reader practices subvocalization.

It is a further dominant object to cause habits which slow the reading process comprising subvocalization to be broken and replaced with chunking skills.

It is an important object to provide at least one form of auditory stimuli to one car addressed for delivery through that ear's central nervous system pathways to one hemisphere of the brain and another form of auditory stimuli to the other ear addressed for delivery through the second ear's central nervous system pathways to the other hemisphere of the brain.

It is a principal object to provide an audible beat to the reader's ear which has the best contact through central nervous system pathways to the hemisphere of the brain which governs thought related to time and rhythm to associatively stimulate the rate of finger movement across a page of text.

It is a further principal object to send subliminal affirmation signals to the reader's ear which has the best contact through central nervous system pathways to the hemisphere of the brain which governs creative thought.

It is a meaningful object to provide background music and/or other soothing sounds to block aural interference and provide a soothing auditory learning environment.

It is a major object to provide a system and method which allows the reader a measure of control over the tempo of the audio beat.

These and other objects and features of the present invention will be apparent from the detailed description taken with reference to accompanying drawings.

DETAILED DESCRIPTION OF THE ILLUSTRATED EMBODIMENTS

Figure 1:
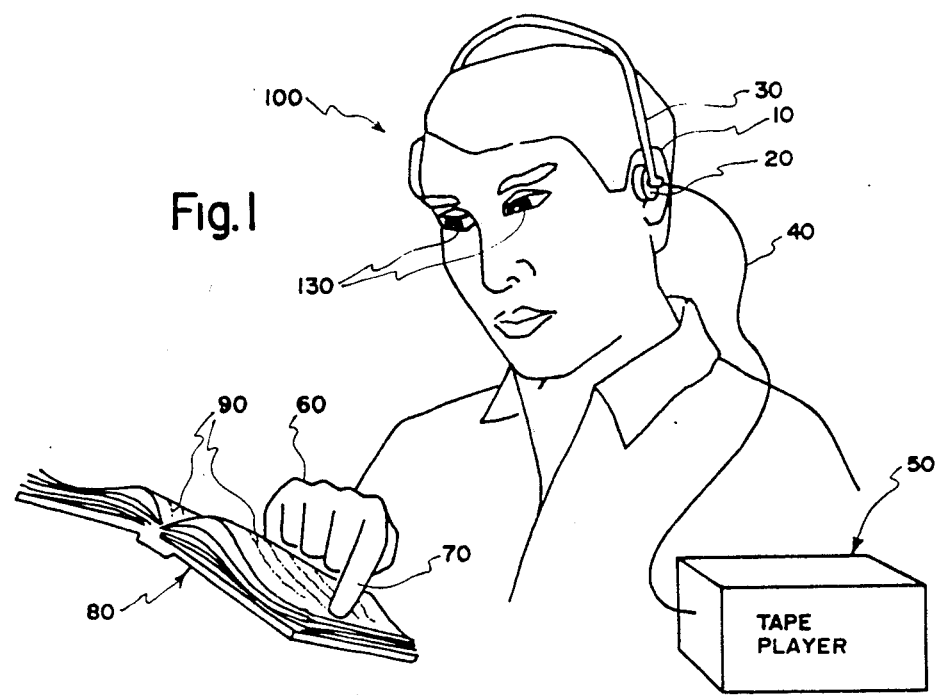
FIG. 1 is a frontal view of a reader wearing stereophonic earphones.
Figure 2:
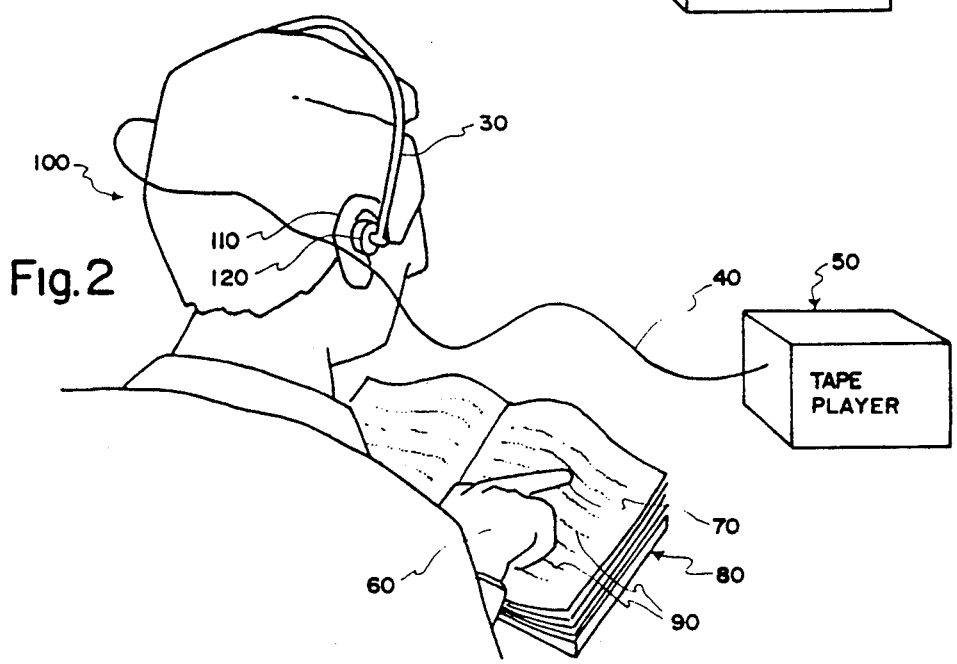
FIG. 2 is a rear view of the same reader shown in FIG. 1.
Figure 3:
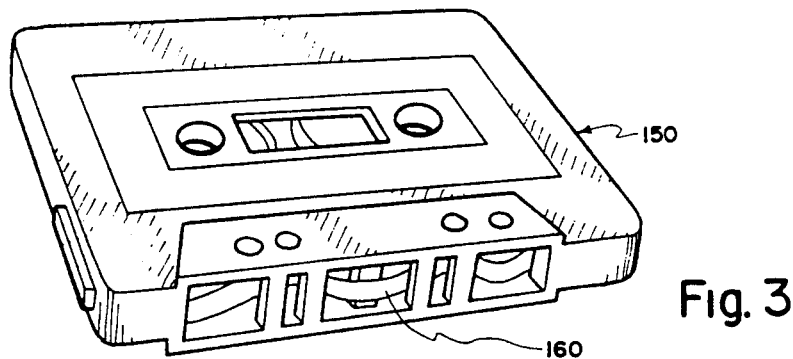
FIG. 3 is a perspective view of an audio tape cartridge.

Reference is now made to the currently preferred embodiment illustrated in FIGS. 1-6 wherein like numerals are used to designate like parts throughout. As can be seen in FIGS. 1-3, apparatus required to implement the present method comprise book 80, tape cassette 150, stereophonic tape recorder 50, and headset 30 comprising stereophonic earphones comprising left speaker 20 and right speaker 120. The illustrated apparatus can comprise selections from a number of conventional audio playback systems, recordings, and conventional stereophonic headsets. The stereophonic signals recorded on the recordings, in the illustrated case tape 160 of tape cassette 150, are an integral part of the method and must be properly prerecorded, as described later.

Setup for the method comprises selecting an audio tape cassette 150 comprising prerecorded tape 160 which comprises signals which effect a desired reading rate. The tape also comprises the method's other auditory signals which are described later in the specification.

Audio tape cassette 150 is inserted into tape recorder 50 which is stereophonically connected through electrical cable 40 to headset 30 comprising speakers 20 and 120. Speaker 20, mounted on the left side of reader 100, addresses information primarily to the right hemisphere of the brain through left ear 10. Speaker 120, mounted on the reader's right side, addresses the left hemisphere of the brain through right ear 110. Book 80 is placed at a comfortable reading distance from the eyes 130 of reader 10. Index finger 70 of dominant hand 60 is positioned just below the first line to be read of text 90. In lieu of a finger, a stick, pencil, or other object may be manually held and used. Tape player 50 is turned on, and reading-training begins.

The reading-training method comprises correlatively and associatively combining activity of senses comprising visual, tactile, and auditory to break subvocalization habits and acquire greater chunking skills. To accomplish this, finger 60 is stimulated to move across text 90 at controlled, but increasing rates. Reader eyes 130, attempting to follow finger 60, ultimately cannot assimilate words rapidly enough to be subvocalized. As a natural consequence, reading by chunking replaces subvocalization, resulting in higher reading rates and comprehension.

Reading skills improve more rapidly when finger 60 movement is rhythmic. Rhythmic movement is primarily interpreted and incited by thought processes in the left hemisphere of the brain which embraces thought processes comprising spatial relations, time, logic, and mathematics. In one currently preferred embodiment, the prerecorded tape 160 channel which comprises rhythmic beat signals is monophonically connected to speaker 120 and broadcasts to right ear 110 wherefrom audible signals are addressed to the left hemisphere of the brain.

The other prerecorded tape 160 channel is connected to left ear 10 through speaker 20. Subliminal affirmations which are too quiet to be heard consciously, but which are discernable subconsciously, are addressed to the right brain, thereby. Subliminal affirmations enter the mind without being evaluated, blocked or otherwise screened to inhibit processing of data the conscious mind is unwilling to accept. Printed lists of all subliminal affirmations are provided for reader 100 to consciously read before training begins such that the contents of subliminal affirmations are known and can be correlated by the conscious and subconscious minds during training.

Prerecorded tape 160 also provides background music for purposes comprising blocking aural interference and soothing and calming auditory environment to enhance the concentrating and learning conditions.

Figure 4:
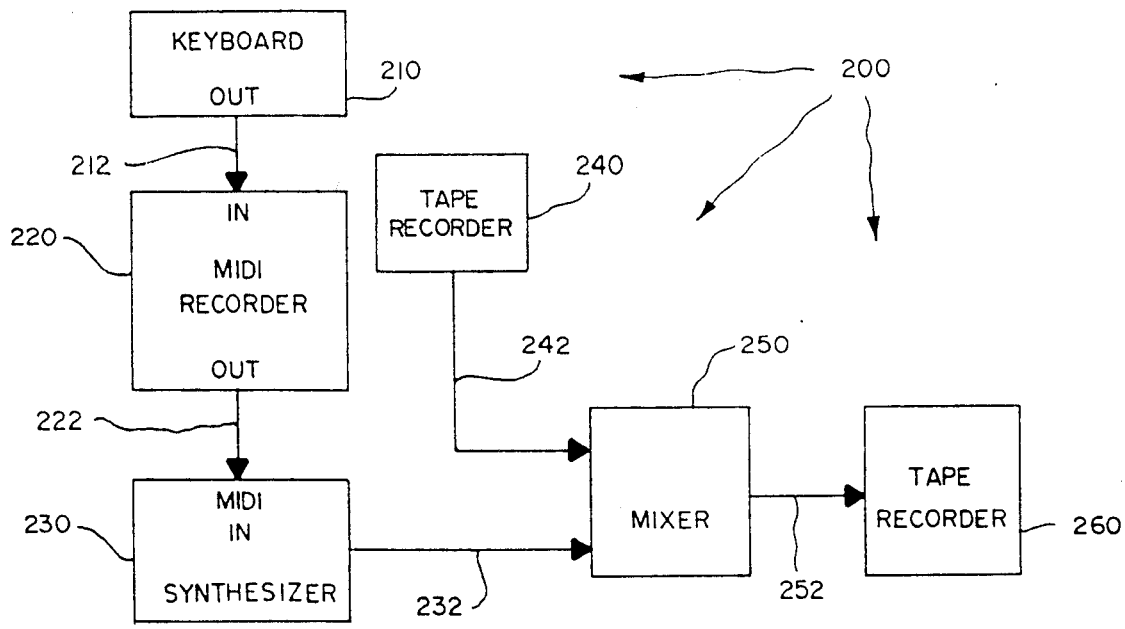
FIG. 4 is a block diagram of the major items of a system used to create a recording for speed reading auditory input.

One mode of soothing and calming background sound comprises a mix of ocean waves and related sounds with the rhythmic beats. To produce a tape 160, a tape recording production system 200 comprising a keyboard 210, a musical instrument digital interface (midi) recorder 220, a music synthesizer 230, a dual track tape recorder 240, a mixer 250, and a sixteen track tape recorder 260 is interconnected as shown in FIG. 4. While the invention is not in any way restricted to the equipment described, an example of equipment used for system 200 is as follows:

| EXEMPLARY TAPE GENERATION EQUIPMENT | | |
| --- | --- | --- |
| Item no. | Related Figure no. | Description |
| 1. | 260 | 1" 16 track tape recorder |
| 2. | 240 | ¼" 2 track tape recorder |
| 3. | 230 | Kurzweil 1000 PX expander |
| 4. | 210 | Lexicon PCM 70 D.E.P. |
| 5. | 220 | Linn 9000 midi recorder |
| 6. | 250 | TAC mixing console |

The output of keyboard 210 is connected to the input of midi recorder 220 along cable 212. Cable 222 connects the midi output of midi recorder 220 directly to midi input of synthesizer 230. Interconnecting cable 232 connects to one input cable connection of mixer 250. Another cable input connection of mixer 250 is connected through cable 242 to the output of dual channel tape recorder 240. The output of mixer 250 connects directly to sixteen track taper recorder 260 where the final master tape is recorded. From the master tape, tape 160 is copied for use in the speed reading apparatus. Power supply connections are not shown.

To create a tape recording for a specific beat frequency, particular adjustments and settings are made to the synthesizer 230 and midi recorder 220 prior to beginning each recording. The various values provided in the following description are exemplary only and establish a specific frequency which sets a particular line reading rate. Different settings are required for the broad spectrum of line-rate reading frequencies used on various tapes in a reader training system. In this recording, three wave shapes are selected on synthesizer 230. In combination, the first two waves each provide a broad spectrum white noise signal, one comprising high frequency noise and the other comprising low frequency noise. These waves are known as 4567 wave and high noise on the Kurzweil 1000 PX expander, although any broad spectrum noise signal can be used. The third wave form is a sine wave.

Figure 5:
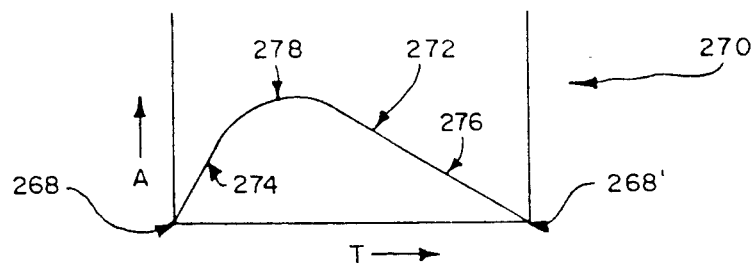
FIG. 5 is graph showing an amplitude versus time waveform of a single line-scan-rate determining beat provided by the system of FIG. 4.

An adjustment, called attack, which determines the rate at which a given wave rises from minimum to maximum db is set for each wave. As seen in FIG. 5, the basic beat signal 272 comprises a rising leg 274 and falling leg 276 as plotted on a signal strength or amplitude (A) versus time (t) graph. Attack time is the length of leg 274 which extends from beat beginning 268 to peak volume 278. As an example, for sixty beats per minute, the attack for the first two waves is set at 1.90 seconds. The attack for the third wave is 0.20 seconds. These values vary as the tempo increases or decreases.

The falling leg 276 which comprises the wave segment from volume peak 278 to the end of the boat 268', which, of course, is the beginning of the next beat. Signal reduction is controlled during the falling leg to bring the signal to a repetitive beginning point for the initiation of each next beat. The time constant which determines the period of decay or the time required to bring the falling leg to the repetitive beginning point requires a setting of 5.00 seconds for the first two waves.

The ear interprets the sound pattern of beat signal 272 as a whir of noise rapidly rising to a crescendo then falling at a slower rate, to be repeated with the next beat. The third wave is used to provide an audible mark signalling the beginning of each beat for more precise interpretation of the beat beginning 268. For this reason the third wave attack is the very short 0.20 seconds. For the same reason the period of decay of the third wave is also short, being set to 0.40 seconds.

Prerecorded sounds are "mixed" with the output of synthesizer 230 in mixer 250. In this embodiment, ocean waves and related sounds are recorded on a first channel of tape recorder 240. On a second channel of tape recorder 240, sequentially oriented messages to be sent as subliminal affirmations to a single ear are recorded.

In mixer 250, inputs from cables 232 and 242 are mixed such that one channel comprises subliminal messages and ocean wave and/or related sounds, which provide a relaxing aural background. The second channel comprises beat signals mixed with the ocean wave and/or related sounds. Thus a specific sound pattern is recorded for each ear.

The following exemplary table provides an abridged list of the subliminal affirmations used in this embodiment:

Affirmations:
You are a gifted reader.
You can read as fast as you wish to read.
You are reading comfortably.
Your mind is relaxed.
You can comprehend better as you read faster.
You are able to read faster every day.
Each time you read, you enjoy it more.
Your reading ability is improving.
You want to continue to improve your reading skills.
Your eyes are able to follow your hand as you read.
You enjoy the sensation of following the tone.
Your read better each time you read.
Reading is entertaining.

Such subliminal affirmations are repeated over and over as the reading tapes are used. As earlier stated, it is recommended that a complete subliminal message list be made available to the reader, to be distributed with the tapes for associative learning. As an example, subliminal messages may be recorded at −30 db or 30 decibels lower in amplitude from the nominal peak level of the recorded beats. In similar manner ocean wave and/or related sounds may be recorded at −22 db.

Figure 6:
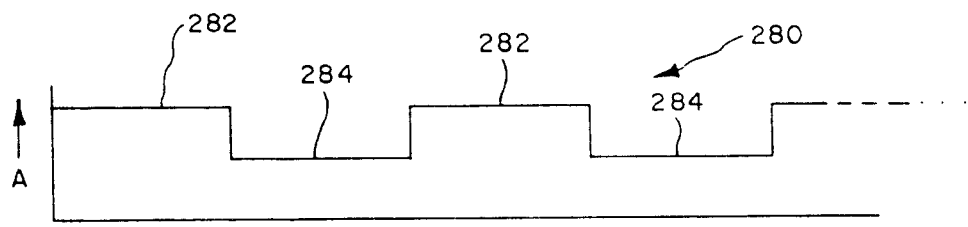
FIG. 6 is a graph showing an amplitude versus time plot which represents a periodic change in overall amplitude of beat signals to reduce the effect of adaptation in a reader's auditory neural system.

Prerecorded tapes 160 are thus made for a range of beat signal 272 frequencies. Each reader 100 selects a tape 160 comprising a beat frequency compatible with a desired reading rate. The beat frequencies provided in this current embodiment range from 10 to 160 beats per minute although a wider or narrower range is within the scope of this invention. To keep the reader alert to the beats and ameliorate attention lapses due to neural adaptation to the repetitive beat pattern, the mean amplitude of peak volume 278 is periodically varied as shown in FIG. 6. The currently preferred period between mean beat amplitude changes (i.e. from one peak volume 278 level 282 to another peak volume 278 level 284, or vice versa) is three minutes, although different periods may be used within the scope of the invention.

In another currently preferred embodiment, rhythmic beat signals from a tape 160 are mixed with ocean waves or other similar soothing background sounds and monophonically steered to the right ear as earlier described. However, to eliminate a confusing imbalance in the sound level to each ear, similar rhythmic beat signals and background sounds are mixed with subliminal affirmations, and sent, therewith, to the left ear. In this embodiment, the subliminal messages are strictly restricted to the left ear 10 for more direct communication with the right hemisphere of the brain and reducing or eliminating conflict with the process of reading and understanding written words which primarily occurs in the left hemisphere of the brain.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A system for increasing reading speed and comprehension without distraction and with improved concentration, said system comprising:
   stereophonic audio playback means comprising separate earphone means for each ear;

prerecorded stereophonic audio recording means, for use in said stereophonic audio playback means, comprising means by which distinct mix of audio signals is communicated to each ear, said recording means comprising:

one stereophonic channel means which delivers a first mix of audio signals comprising a subliminal affirmation signal to the left ear and there primarily to the right side of the brain;

a second stereophonic channel means which delivers a second mix of audio signals exclusive of a subliminal affirmation signal to the right ear and thence primarily to the left side of the brain, the second mix of audio signals comprising a make up which does not distract the reader nor compete at the left side of the brain with the processing of the written word.

2. A system according to claim 1 wherein the first mix of audio signals comprise beat signals and background signals.

3. A system according to claim 1 wherein the second mix of audio signals comprise beat signals and background signals.

4. A system according to claim 1 wherein the first and second mixes of audio signals each comprise beat signals and background signals.

5. A system according to claim 4 wherein the beat signals delivered to the left and right ears respectively are substantially identical.

6. A system according to claim 4 wherein the background signals delivered to the left and right ears respectively are substantially identical.

7. A system according to claim 4 wherein at least one mix comprises white noise.

8. A system according to claim 7 wherein the white noise varies in volume or amplitude from a relatively low level to a relatively high peak level to a relatively low level by which a sensation of a beat is created.

* * * * *